United States Patent
Li et al.

(10) Patent No.: US 12,014,055 B2
(45) Date of Patent: Jun. 18, 2024

(54) LOW LATENCY SSD READ ARCHITECTURE WITH MULTI-LEVEL ERROR CORRECTION CODES (ECC)

(71) Applicant: Samsung Electronics Co., Ltd., Suwon-si (KR)

(72) Inventors: Zongwang Li, Dublin, CA (US); Jing Yang, San Jose, CA (US); Marie Mai Nguyen, Pittsburg, PA (US); Mehran Elyasi, Saint Paul, MN (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/694,657

(22) Filed: Mar. 14, 2022

(65) Prior Publication Data

US 2022/0374152 A1    Nov. 24, 2022

Related U.S. Application Data

(60) Provisional application No. 63/302,023, filed on Jan. 21, 2022, provisional application No. 63/191,916, filed on May 21, 2021.

(51) Int. Cl.
*G06F 12/00* (2006.01)
*G06F 3/06* (2006.01)

(52) U.S. Cl.
CPC .......... *G06F 3/0619* (2013.01); *G06F 3/0611* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,477,610 B1 | 11/2002 | Willenborg | |
| 7,917,903 B2 | 3/2011 | Lumb et al. | |
| 8,954,831 B2 | 2/2015 | Anholt et al. | |
| 9,176,708 B2 | 11/2015 | Gallant et al. | |

(Continued)

FOREIGN PATENT DOCUMENTS

| | | |
|---|---|---|
| WO | 2018226278 A1 | 12/2018 |
| WO | 2019204017 A1 | 10/2019 |

OTHER PUBLICATIONS

Bjorling, Matias et al., "Linux Block IO: Introducing Multi-Queue SSD Access on Multi-Core Systems", Proceedings of the 6th International Systems and Storage Conference, 2013, 10 pages.

(Continued)

*Primary Examiner* — Daniel D Tsui
(74) *Attorney, Agent, or Firm* — Renaissance IP Law Group LLP

(57) ABSTRACT

A storage unit is disclosed. The storage unit may include storage for a component codeword. The component codeword may be stored in a block in the storage. The block may also store a block codeword. An interface may receive a read request for a chunk of data from a host and may send the chunk of data to the host. A circuit may read the component codeword from the block in the storage. An error correcting code (ECC) decoder may determine the chunk of data based at least in part on the component codeword.

20 Claims, 13 Drawing Sheets

(56) References Cited

U.S. PATENT DOCUMENTS

| | | |
|---|---|---|
| 9,236,890 B1 | 1/2016 | Anholt et al. |
| 9,477,412 B1 | 10/2016 | Amar et al. |
| 9,712,401 B2 | 7/2017 | Wright et al. |
| 9,772,787 B2 | 9/2017 | Oikarinen et al. |
| 9,971,534 B2 | 5/2018 | Starr |
| 10,230,403 B2 | 3/2019 | Freudenberger et al. |
| 10,318,174 B2 | 6/2019 | Kim et al. |
| 10,884,667 B2 | 1/2021 | Yu et al. |
| 11,068,342 B1 | 7/2021 | Alrod et al. |
| 11,099,754 B1 | 8/2021 | Mallick et al. |
| 11,139,831 B2 | 10/2021 | Zhang et al. |
| 11,403,253 B2 | 8/2022 | Pandya et al. |
| 2007/0156955 A1 | 7/2007 | Royer et al. |
| 2009/0265506 A1 | 10/2009 | Yim |
| 2012/0066448 A1 | 3/2012 | Colgrove et al. |
| 2012/0110417 A1* | 5/2012 | D'Abreu ............ G06F 11/1012 714/763 |
| 2012/0303842 A1 | 11/2012 | Cardinell et al. |
| 2013/0212349 A1 | 8/2013 | Maruyama |
| 2016/0266934 A1 | 9/2016 | Rimoni |
| 2016/0291884 A1 | 10/2016 | Halaharivi et al. |
| 2018/0121366 A1 | 5/2018 | Tian |
| 2018/0321844 A1 | 11/2018 | Benisty |
| 2018/0322075 A1 | 11/2018 | Kim et al. |
| 2019/0196969 A1 | 6/2019 | Yang et al. |
| 2020/0127685 A1 | 4/2020 | Chen et al. |
| 2020/0167098 A1 | 5/2020 | Shah et al. |
| 2020/0293465 A1 | 9/2020 | Yang et al. |
| 2020/0348977 A1 | 11/2020 | Yi et al. |
| 2020/0356621 A1 | 11/2020 | Chen et al. |
| 2021/0117316 A1 | 4/2021 | Jia et al. |
| 2021/0232339 A1 | 7/2021 | Mehra |
| 2021/0255971 A1 | 8/2021 | Lee |
| 2021/0263676 A1 | 8/2021 | Patel et al. |
| 2021/0263677 A1 | 8/2021 | Patel et al. |
| 2021/0286557 A1 | 9/2021 | Kim |
| 2022/0269442 A1 | 8/2022 | Jeong et al. |
| 2022/0342703 A1 | 10/2022 | Hong et al. |
| 2022/0374149 A1 | 11/2022 | Li et al. |

OTHER PUBLICATIONS

Mansour, Mohammad M. et al., "Turbo Decoder Architectures for Low-Density Parity-Check Codes", Global Telecommunications Conference, 2002, GLOBECOM '02. IEEE, 2002, pp. 1383-1388.

Naumov, Maxim et al., "Deep Learning Recommendation Model for Personalization and Recommendation Systems" arXiv preprint arXiv:1906.00091 (2019), 10 pages.

Shin, Woong et al., "OS I/O Path Optimizations for Flash Solid-State Drives" 2014 USENIX Annual Technical Conference, 2014, 7 pages.

Tavakkol, Arash et al., "MQSim: A Framework for Enabling Realistic Studies of Modern Multi-Queue SSD Devices", 16th USENIX Conference on File and Storage Technologies, 2018, 18 pages.

Wilkening, Mark et al., "RecSSD: Near Data Processing forSolid State Drive Based Recommendation Inference" Proceedings of the 26th ACM International Conference on Architectural Support for Programming Languages and Operating Systems, ASPLOS 26, 2021, 13 pages.

European Extended Search Report for Application No. 23152227.7, dated Jun. 2, 2023.

Office Action for U.S. Appl. No. 17/694,662, dated Apr. 27, 2023.

Office Action for U.S. Appl. No. 17/694,662, mailed Oct. 2, 2023.

European Office Action for Application No. 23152227.7, mailed Feb. 5, 2024.

Ke, Liu et al., "RecNMP: Accelerating Personalized Recommendation with Near-Memory Processing," 2020 ACM/IEEE 47th Annual International Symposium on Computer Architecture (ISCA), 2020, pp. 790-803.

* cited by examiner $$H = \begin{bmatrix} H_{c0} & 0 & \ldots & 0 & 0 \\ 0 & H_{c1} & \ldots & 0 & 0 \\ \vdots & \vdots & & \vdots & \vdots \\ 0 & 0 & \ldots & H_{cn} & 0 \\ H_{spc0} & H_{spc1} & \ldots & H_{spcn} & H_{sp} \end{bmatrix}$$

405

LOW LATENCY SSD READ ARCHITECTURE WITH MULTI-LEVEL ERROR CORRECTION CODES (ECC)

RELATED APPLICATION DATA

This application claims the benefit of U.S. Provisional Patent Application Ser. No. 63/302,023, filed Jan. 21, 2022, and U.S. Provisional Patent Application Ser. No. 63/191,916, filed May 21, 2021, both of which are incorporated by reference herein for all purposes.

FIELD

The disclosure relates generally to storage devices, and more particularly to an architecture for low latency read request.

BACKGROUND

The present background section is intended to provide context only, and the disclosure of any concept in this section does not constitute an admission that said concept is prior art.

Storage devices may store data in units that are relatively large: for example, approximately 4 KB in size. Performing error correction on 4 KB of data may take a relatively long length of time, which may delay returning the result of a read request to the host.

A need remains to provide for low latency reads in storage devices.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
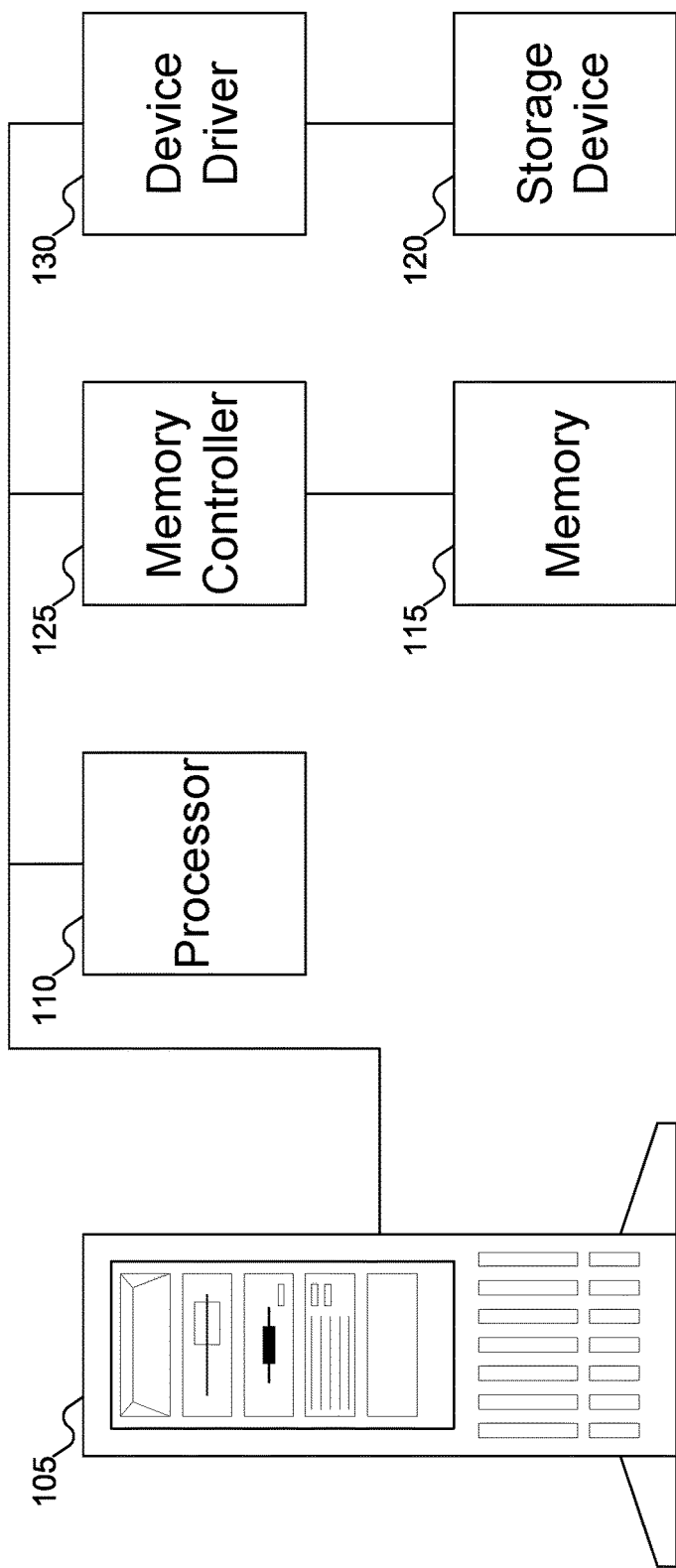
FIG. 1 shows a machine with a storage device supporting a low latency read architecture, according to embodiments of the disclosure.

Embodiments of the disclosure may include a storage device. The storage device may include a component codeword and a block codeword. An interface may receive a read request for a chunk of data. A circuit may read the component codeword. An error correcting code (ECC) decoder may determine the chunk of data based on the component codeword.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Storage devices enable computer systems to write data for long term storage, and to read that data later. The amount of storage offered by such storage devices continues to grow, with multi-terabyte storage devices currently becoming the norm.

But storage devices are not perfect. Whether the storage device is a hard disk drive using magnetic encodings for bits or a solid state drive (SSD) using voltages to encode bits, errors may occur. If an error occurs in the data stored on the storage device, the application requesting the data might not receive the correct data, which might affect all downstream operations.

To protect against errors, storage devices may offer error correction. A storage device may store error correcting codes (ECCs) along with the data. If an error is detected in the data, the ECCs may be able to correct for the error, so that the requesting application may receive the correct data. Larger ECCs might support stronger correction (that is, larger ECCs may be able to identify and/or correct for more errors). Conversely, shorter ECCS might support weaker correction, and the storage device may be able to detect and/or correct fewer errors. As an example, a Hamming code may detect and correct a single bit error in a message, but might not be able to detect two bit errors. By adding another bit to the Hamming code, a Hamming code may be able to detect two bit errors in the message (although the Hamming code might not be able to correct for two bit errors). But while larger ECCs may support stronger correction, larger ECCs may also require more storage be used for the ECCs, potentially reducing the amount of storage available for the data.

Storage devices typically store data in units of a particular size, and the error correcting codes may be consistent with that size of data. For example, SSDs may store data in blocks of 2 KB, 4 KB, 8 KB, or other sizes. (While block sizes other than a number of bits that is a power of two are possible, such block sizes may offer some additional efficiencies.) When an application requests that some data be read, the block storing the data may be identified and the data and the ECCs for the data may be read. An ECC decoder may verify that the data was read correctly; if not, the ECC decoder may use the ECCs to attempt to correct the errors. (As discussed above, the ECC decoder might have a limit on the number of errors that may be identified and/or corrected: if this limit is exceeded, then the ECC decoder might be unable to correct for the errors.)

But an ECC detector may have to read the entire unit of data and the entire ECC for that unit of data to perform error correction. For example, to perform error correction on a 4 KB block of data, the entire 4 KB block is read. The larger the amount of data to be processed, and the larger the codeword, the longer the ECC detector may take to perform error detection and/or correction. The time required for the ECC detector to operate may therefore be independent of the amount of data actually requested by the host. Put another way, whether the host requests the entire 4 KB block or only 128 B from that block, the ECC detector may operate on the entire 4 KB block. For a single read request, this delay might be acceptable. But for applications issuing hundreds or thousands of read requests, such as Deep Learning Recommendation Models (DLRMs), this delay may be multiplied across all such read requests, and may result in a measurable reduction in efficiency (with the application waiting for the storage device to return data).

Embodiments of the disclosure may address these problems by providing for a multi-level ECC decoder architecture. Instead of performing ECC decoding on a larger unit (such as a 4 KB block), ECC decoding may be performed on a smaller unit (such as 128 B chunk). When a read request arrives, the chunk of data may be identified the codeword associated with the chunk of data may be accessed. ECC decoding may then be performed on the chunk rather than on the larger unit, which may result in faster processing.

In most cases, no errors may be detected or the errors may be corrected based on the codeword for the chunk, and the data may be returned more rapidly. In cases where the ECC decoder is unable to correct the chunk based on the codeword associated with the chunk, the codeword for the larger unit may be read. The ECC decoder may then attempt to correct for errors at the larger unit level, after which the chunk of data may be extracted from the larger unit.

Using such a read architecture, a low latency read may be performed in most situations. In cases where error correction based on the ECC of the smaller unit may not be performed, error correction based on the larger unit may still be possible, with only a small overhead.

FIG. 1 shows a machine with a storage device supporting a low latency read architecture, according to embodiments of the disclosure. In FIG. 1, machine 105, which may also be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, a mobile device, etc.

Machine 105 may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may be a volatile or non-volatile memory, as desired. Memory 115 may use any desired form factor: for example, Single In-Line Memory Module (SIMM), Dual In-Line Memory Module (DIMM), Non-Volatile DIMM (NVDIMM), etc. Memory 115 may also be any desired combination of different memory types.

Memory 115 may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may also include any desired interface, including, for example, a Peripheral Component Interconnect Express (PCIe) interface, a Compute Express Link (CXL) interface, a U.2 interface, a U.3 interface, or a M.2 interface. Storage device 120 may support byte-addressing, where individual bytes may be accessed from storage device 120, or block addressing, where larger units of data may be accessed from storage device 120 (and the application, the operating system, or the file system may determine the particular bytes of interest after the larger unit is accessed from storage device 120).

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure.

The term "storage unit" is intended to encompass both storage device 120 and memory 115. That is, where the term "storage unit" is used below, the term should be understood as including both storage device 120 and memory 115. While the discussion below may focus on storage device 120 (and potentially more particularly on an SSD), it may be understood that embodiments of the disclosure may similarly cover memory 115, whether or not expressly stated, and thus may be understood more generally to be about a storage unit.

Some applications may read large amounts of data that may be stored contiguously. For such applications, blocks of data (which may be, for example, approximately 4 KB in size) may be read. Error Correcting Codes (ECCs) may be used to ensure that the data is read correctly from the storage device.

But other applications may read relatively small amounts of data, or large amounts of data that might be scattered as small amounts of data across a number of blocks. For example, Deep Learning Recommendation Models (DLRMs) may store data as vectors in embedding tables. These embedding tables may be large: for example, embedding tables might store gigabytes or terabytes of data. But each vector might be relatively small: for example, each vector might include 128 data points, with each data point using four bytes (for approximately 512 B per vector), or each vector might include 64 data points, with each data point using two bytes (for a total of 128 B per vector). An example read request might involve reading, say, 64 vectors—a total of 32,768 B or 8192 B in the above examples—from an embedding table. It could happen that these vectors are scattered across various blocks on storage device 120. In other words, from each 4 KB block, only 512 B (or 128 B) might be of interest.

If ECC is applied to the block as a whole, then to read a vector, the entire block in which the vector is stored may be read and verified using ECC. But if only 512 B, or worse only 128 B, from a single vector in that block is of interest, reading and decoding the entire 4 KB block may take time, which may slow execution of the DLRM. If this time is multiplied across a large number of vectors—for example, 64 vectors, each stored in a different block in storage device 120—the delay may become significant.

Figure 2:
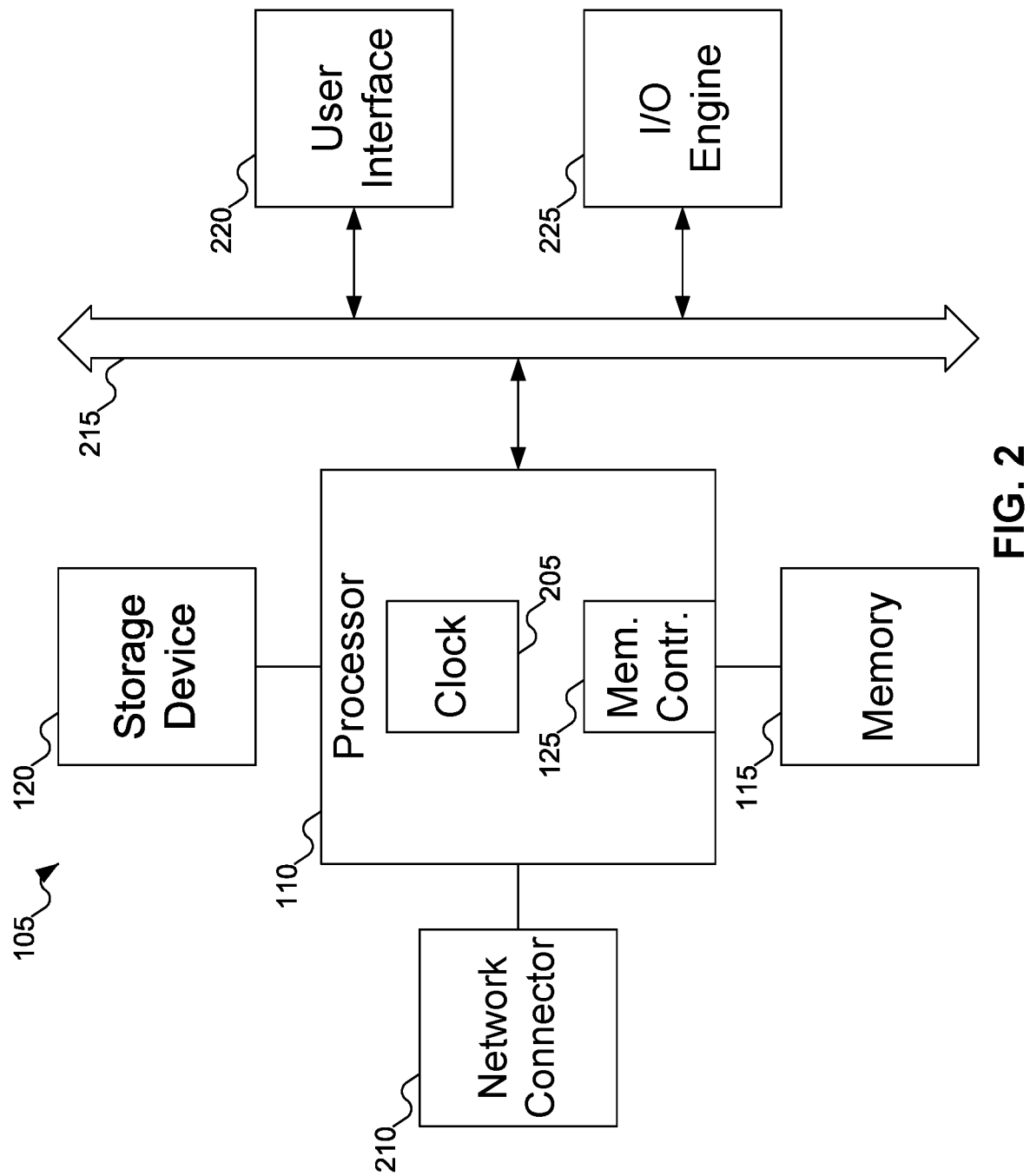
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
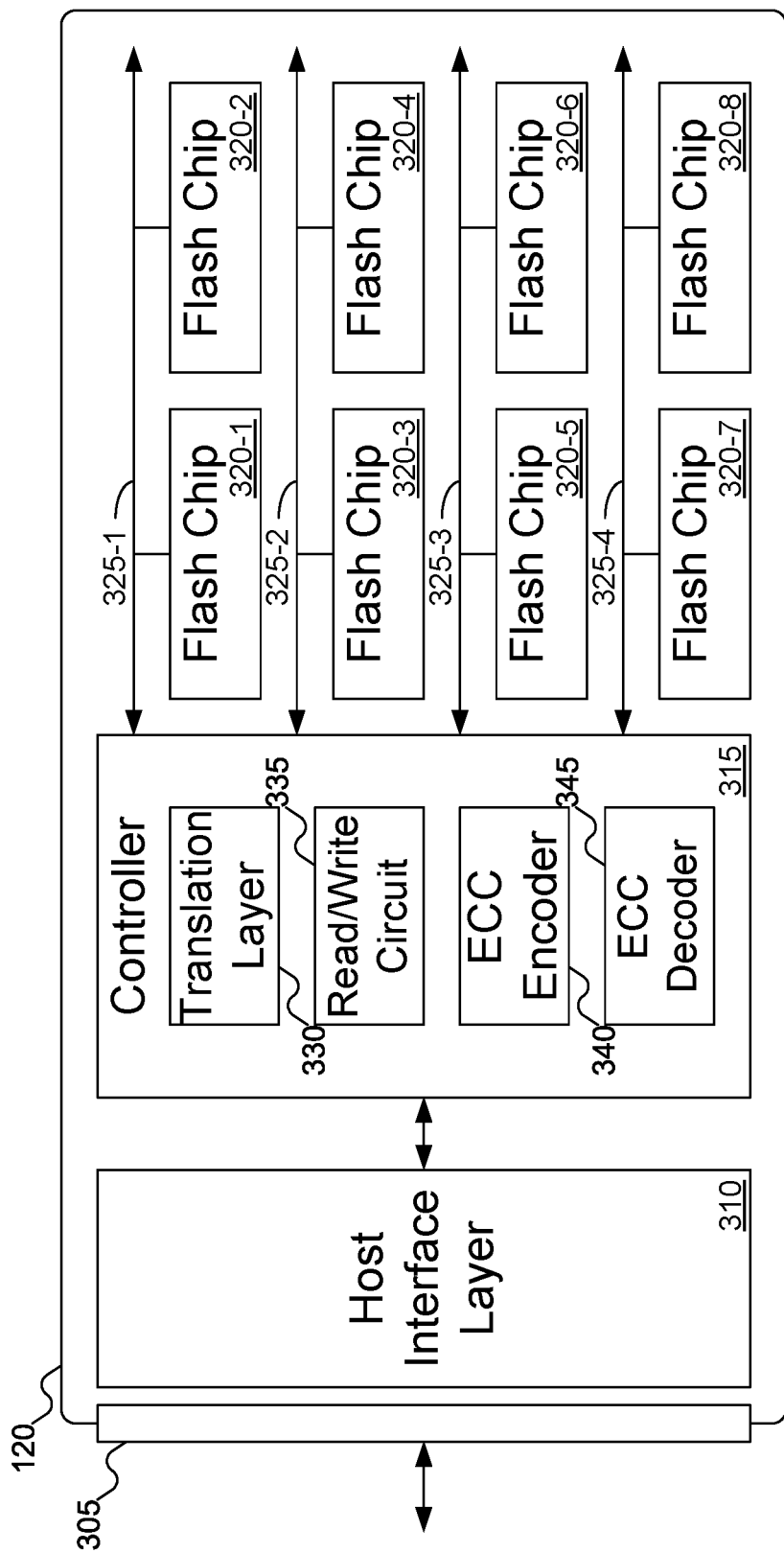
FIG. 3 shows details of the storage device of FIG. 1, according to embodiments of the disclosure.

FIG. 3 shows details of storage device 120 of FIG. 1, according to embodiments of the disclosure. In FIG. 3, the implementation of storage device 120 is shown as for a Solid State Drive. In FIG. 3, storage device 120 may include interface 305, host interface layer (HIL) 310, controller 315, and various flash memory chips 320-1 through 320-8 (also termed "flash memory storage"), which may be organized into various channels 325-1 through 325-4. Interface 305 may be the physical interface used to connect storage device 120 to other components of machine 105 of FIG. 1, and may include, for example, a Peripheral Component Interconnect Express (PCIe) interface, a Compute Express Link (CXL) interface, a U.2 interface, a U.3 interface, or a M.2 interface, among other possibilities.

Host interface layer 310 may manage communications between storage device 120 and other components (such as processor 110 of FIG. 1) across interface 305. Host interface layer 310 may also manage communications with devices remote from storage device 120: perhaps over one or more network connections. These communications may include read requests to read data from storage device 120, write requests to write data to storage device 120, and delete requests to delete data from storage device 120.

Host interface layer 310 may manage interface 305 with only one port, or it may manage interface 305 across multiple ports. In addition, host interface layer 310 may manage multiple interfaces 305, if storage device 120 includes such multiple interfaces. Alternatively, storage device 120 may include multiple ports, each of which may have a separate host interface layer 310 to manage communications across that port. Embodiments of the disclosure may also mix the possibilities (for example, an SSD with three ports might have one host interface layer to manage one port and a second host interface layer to manage the other two ports).

Controller 315 may manage the read and write operations, along with garbage collection and other operations, on flash memory chips 320-1 through 320-8. SSD controller 315 may include translation layer 330, read/write circuit 335, ECC encoder 340, and ECC decoder 345. Translation layer 330 may manage the mapping of logical addresses, as used by host 105 of FIG. 1, to physical addresses where the data is actually stored on storage device 120. By using translation layer 330, host 105 of FIG. 1 does not need to be informed when data is moved from one physical address to another within storage device 120.

Read/write circuit 335 may be used, to process read and write requests from machine 105 of FIG. 1. While FIG. 3 shows read/write circuit 335 as a combined circuit, embodiments of the disclosure may include separate circuits for reading and writing data. In addition, embodiments of the disclosure may include multiple read and/or write circuits (or multiple read/write circuits 335) to support parallel read and/or write operations: for example, each channel 325-1 through 325-4 may include separate read/write circuits 335, as reading or writing data on one channel might not affect reading or writing data on another channel.

ECC encoder 340 may perform encoding to support error correction, and ECC decoder 345 may perform decoding to support error correction. As a high level description of how error correction encoding and decoding, when data is received to be written to storage device 120, this data may be augmented with additional information (which may be thought of as error correcting data). In some embodiments of the disclosure, the combination of the original data as received and the additional information may form a codeword. The additional information may be added to the end of the original data, or the additional information may be interspersed within the original data (the original data may also be rearranged, if desired). For example if the original data includes bits $d_0$ through $d_n$, and the additional information includes bits $e_0$ through $e_k$, then the codeword may be represented as $C=\langle d_0, d_1, d_2, \ldots d_n, e_0, e_1, e_2, \ldots e_k \rangle$ (or some permutation thereof).

The question remains how to select the additional information bits $e_i$. ECC encoder 340 may include a representation of a parity check matrix H. The additional information bits $e_i$ may be selected so that the product of the parity check matrix H and the codeword C satisfy the equation H×C=0. Put another way, if there are no errors in the codeword, the parity check operation represented as H×C should return a zero vector. In general, the parity check matrix H may include many include any number of rows; for the product of the parity check matrix H and the codeword C to be possible, the number of columns in the parity check matrix H may be equal to the number of entries in the (vector) codeword C The product H×C may be thought of as a set of linear equations to be solved: if the set of linear equations has a solution, then the product H×C may be a zero vector.

If the product of the parity check matrix H and the codeword C is not a zero vector, then ECC decoder 345 may determine that there was an error in the codeword C. This codeword with an error (which may also be termed a corrupted codeword) may be represented as codeword $\tilde{C}$. In that case, ECC decoder 345 may attempt to find another codeword $\overline{C}$ that is as "close" to $\tilde{C}$ as possible and for which $H\overline{C}$ is 0. ("Closeness" may be measuring using Hamming distance, which measures the number of characters in the codeword that need to be altered to change one word to another.) If such a codeword $\overline{C}$ may be found, then ECC decoder 345 may be able to correct for errors in the data; if no codeword $\overline{C}$ may be found, then the data may not be correctable and an error may be returned.

Note that the process described above may be independent of the size of the data. That is, the product H×C may be computed for any codeword C that includes the correct number of entries. But as the parity check matrix H may be determined in advance (for example, at the time of manufacture, or programmed into firmware within storage device 120), the parity check matrix H is generally fixed, both in terms of its size and values. Because the parity check matrix H is generally fixed in size, the size of the codeword C may be dictated by the number of columns in parity check matrix H In other words, if parity check matrix H is expected to operate on a codeword of size 4 KB, it might not be possible to use smaller codewords (since it might not be possible to solve the set of linear equations represented by the product H×C).

But while the size of parity check matrix H might dictate the size of the codeword C, that fact does not prevent the use of variations in the approach, as supported by embodiments of the disclosure. One variation might include ECC encoder 340 and ECC decoder 345 using two different parity check matrices $H_1$ and $H_2$. Parity check matrix $H_1$ might be used to generate or validate codewords of, say, 4 KB size, and parity check matrix $H_2$ might be used to generate or validate codewords of, say 128 B size. In other words, storage device 120 may store one codeword for data of one size (say, 128 B) and another codeword for data of another size (say, 4 KB). Storage device 120 may even have two or more ECC encoders 340 (and/or two or more ECC decoders 345) to support the use of codewords generated using different parity check matrices.

But this solution might not be considered efficient. For example, there are 32 chunks of data of size 128 B in a block of size 4 KB. If different parity check matrices $H_1$ and $H_2$ are used, then approximately 8 KB of storage may be used to store 4 KB of data. Since halving the effective capacity of storage device 120 might not be considered efficient, another approach may be used.

Figures 4, 5:
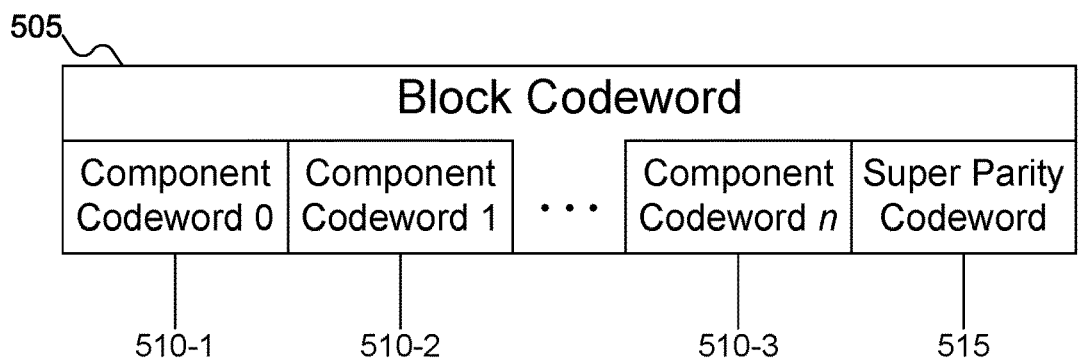
FIG. 4 shows an example of a parity check matrix supporting a low latency read architecture in the storage device of FIG. 1, according to embodiments of the disclosure.
FIG. 5 shows an example structure for a block codeword including component codewords to support a low latency read architecture in the storage device of FIG. 1, according to embodiments of the disclosure.

In another variation, the parity check matrix H shown in FIG. 4 may be used. In FIG. 4, parity check matrix 405 is shown. Parity check matrix 405 may include various parity check sub-matrices along the main diagonal, identified as $H_{c0}$, $H_{c1}$, and so on up to $H_{cn}$. Because each parity check sub-matrix $H_{ci}$ is on the main diagonal, and all other entries in those rows are zero, $H_{ci}$ may be used to validate a component codeword, and parity check matrix 405 may be used to validate a block codeword.

For example, consider block codeword 505 in FIG. 5. Block codeword 505 may include various component codewords 510-1, 510-2, and 510-3 (which may be referred to collectively a component codewords 510). Each component codeword 510 may be validated using a particular parity check sub-matrix $H_{ci}$ of parity check matrix 405 of FIG. 4. For example, parity check sub-matrix $H_{c0}$ may be used to validate component codeword 510-1, parity check sub-matrix $H_{c1}$ may be used to validate component codeword 510-2, and so on up to parity check sub-matrix $H_{cn}$, which may be used to validate component codeword 510-3.

This validation of component codewords 510 using parity check sub-matrices $H_{ci}$ may be done either be extracting a particular parity check sub-matrix $H_{ci}$ and calculating the product $H_{ci} \times C_i$ (where $C_i$ is the $i^{th}$ codeword 510 in block codeword 505), or by calculating the product $H \times \acute{C}$, where $\acute{C}$ is a pseudo-block codeword that has the bits of the $i^{th}$ codeword 510 in place and all other bits set to zero, and then extracting the bits that would represent the product $H_{ci} \times C_i$. The former has the benefit of fewer operations in performing calculating the product $H_{ci} \times C_i$; the latter may simplify the implementation by avoiding potentially using both parity check matrix 405 of FIG. 4 and parity check sub-matrices $H_{ci}$ in calculations (and by recognizing that bits of $\acute{C}$ that are not in the component codeword $C_i$ may not contribute to the result, operations involving those bits may be skipped).

While FIG. 4 shows parity check sub-matrices $H_{ci}$ as being different, embodiments of the disclosure may use the same parity check sub-matrix $H_c$ for more than one component codeword. In fact, embodiments of the disclosure may use the same parity check sub-matrix $H_c$ to validate all component codewords 510. Such embodiments of the disclosure may reduce the amount of storage needed for parity check matrix 405 of FIG. 4, as only one parity check sub-matrix $H_c$ may be stored (and reused as appropriate in matrix operations).

In reviewing FIGS. 4 and 5, it may be observed that parity check matrix 405 of FIG. 4 may also include parity check sub-matrices $H_{sp}$ and $H_{spci}$, and block codeword 505 may also include super parity codeword 515. Parity check sub-matrices $H_{sp}$ and $H_{spci}$ may be used to add additional parity checks against block codeword: in combination with super parity codeword 515, parity check sub-matrices $H_{sp}$ and $H_{spci}$ may provide additional error detection and/or correction capability that may be used across component codewords 510. In this manner, block codeword 505 may still offer stronger correction against errors than component codewords 510 may offer for chunks of data. If component codeword 510 might not be validated or corrected, block codeword 505 may still be used to attempt to determine the data requested by the user from the block.

As with parity check sub-matrices $H_{ci}$, as being different, embodiments of the disclosure may use the same parity check sub-matrix $H_{spc}$ rather than different parity check sub-matrices $H_{spci}$. Such embodiments of the disclosure may reduce the amount of storage needed for parity check matrix 405 of FIG. 4, as only one parity check sub-matrix $H_{spc}$ may be stored (and reused as appropriate in matrix operations).

For the remainder of this document, the term "block" may mean a relatively larger amount of data, such as 4 KB of data, and the term "chunk" may mean a relatively smaller amount of data, such as 128 B. A "block" may be the typical unit for error correction in storage device 120 of FIG. 1, whereas a "chunk" may be an amount of data that may be requested from storage device 120 of FIG. 1 by an application. In addition, the term "block" may refer to units of storage other than a block (for example, a sector, as used with hard disk drives).

In the discussion above (and extending to the discussion below), no distinction is drawn between the size of a codeword and the size of the data. For example, the discussion above refers both to data of size 4 KB and codewords of size 4 KB. Because codewords may include additional data to enable error correction of the original data, it may be understood that if the data is 4 KB in size, the corresponding codeword may be larger than 4 KB in size; similarly, if the size of the codeword is 4 KB, then the corresponding data may be less than 4 KB in size. But as the principles of error detection and/or correction as described herein may be independent of the size of the data or the size of the codeword, there should be no confusion when either data or a codeword is described as being, say, 128 B or 4 KB in size.

Figure 6:
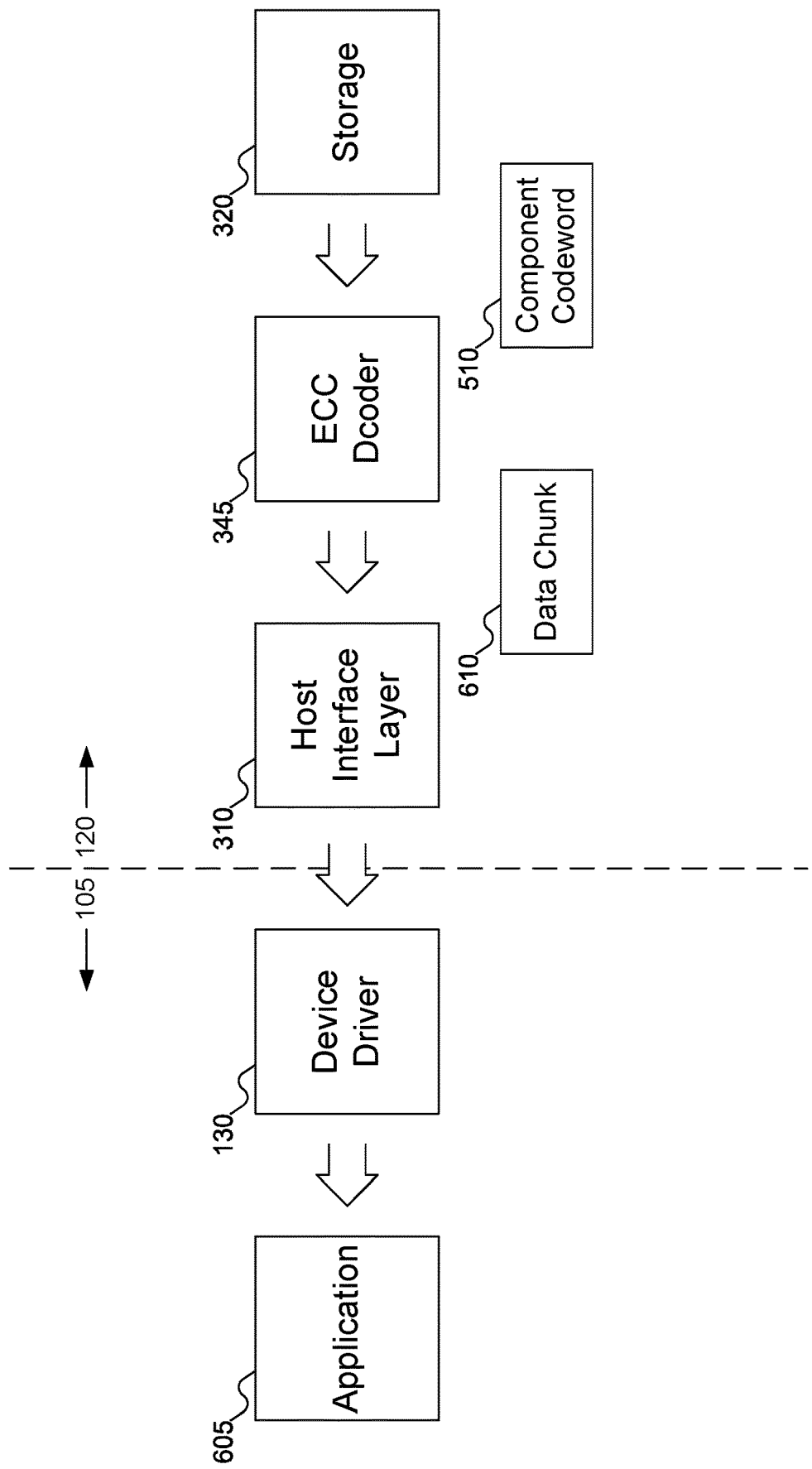
FIG. 6 shows data being read and validated from the storage device of FIG. 1 using a low latency read architecture when the component codeword of FIG. 5 is successfully decoded, according to embodiments of the disclosure.

FIG. 6 shows data being read and validated from storage device 120 of FIG. 1 using a low latency read architecture when component codeword 510 of FIG. 5 is successfully decoded, according to embodiments of the disclosure. In FIG. 6, application 605, running on machine 105, may request a chunk of data be accessed from storage device 120. Ultimately, this read request may be delivered to device driver 130, which may deliver the read request to storage device 120. Host interface layer 310 of storage device 120 may receive the read request, and controller 315 of FIG. 3 may use translation layer 330 of FIG. 3 to determine the block where the requested data resides.

Upon reading the data from storage 320 (using read/write circuit 335 of FIG. 3), component codeword 510 may be extracted from block codeword 505 of FIG. 5. This extraction may be done by read/write circuit 335 of FIG. 3 or by ECC decoder 345. ECC decoder 345 may then attempt to validate component codeword 510. Upon successful validation of component codeword 510, data chunk 610 may be extracted and returned from storage device 120 (via host interface layer 310) back to machine 105 and ultimately to application 605.

If ECC decoder 345 is unable to validate component codeword 510, then ECC decoder may attempt to correct the errors in component codeword 510. If ECC decoder 345 is able to correct the errors in component codeword 510, then data chunk 610 may be extracted and returned from storage device 120 (via host interface layer 310) back to machine 105 and ultimately to application 605.

Figure 7:
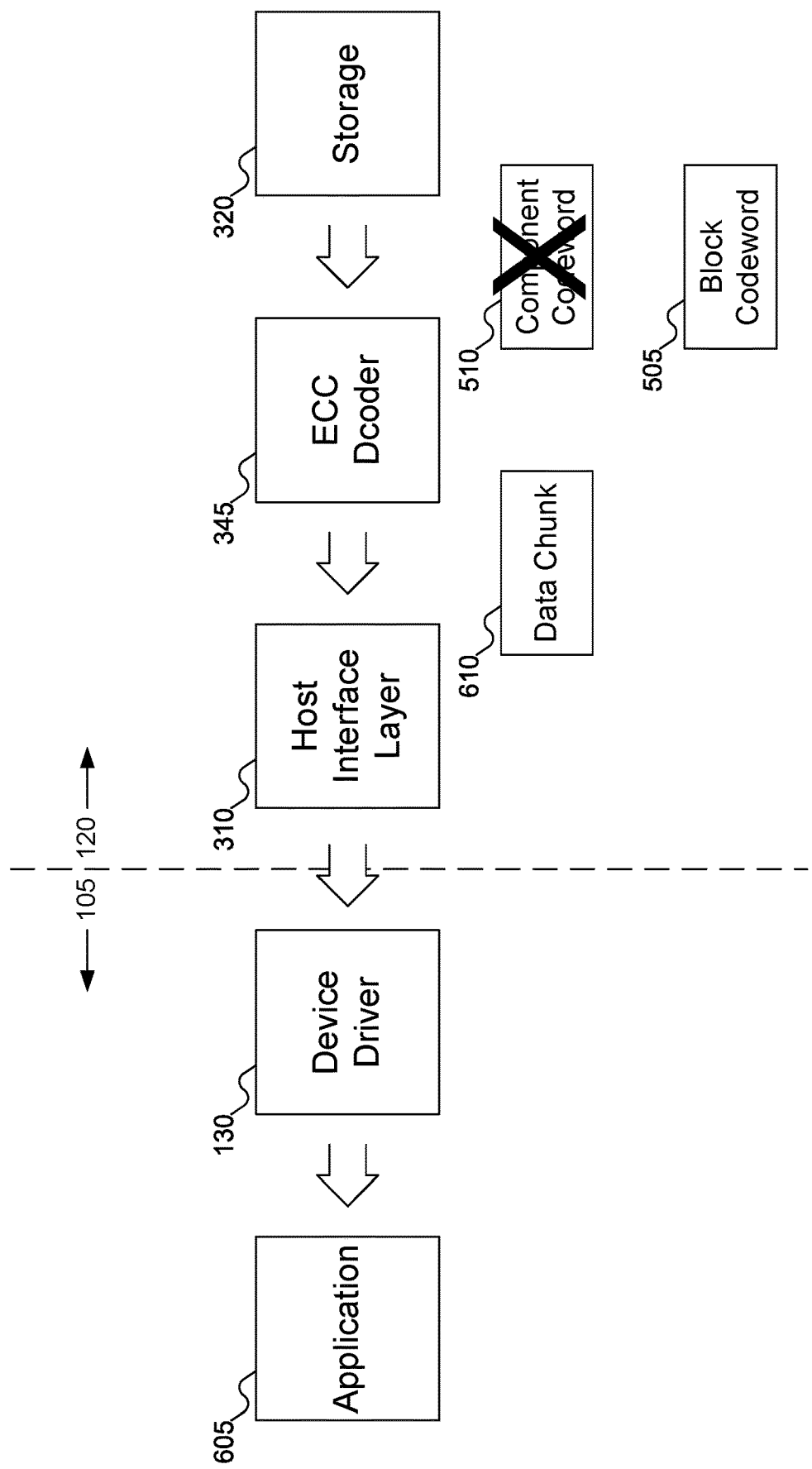
FIG. 7 shows data being read and validated from the storage device of FIG. 1 using a low latency read architecture when the component codeword of FIG. 5 is unsuccessfully decoded, according to embodiments of the disclosure.

FIG. 7 shows data being read and validated from storage device 120 of FIG. 1 using a low latency read architecture when component codeword 510 of FIG. 5 is unsuccessfully decoded, according to embodiments of the disclosure. In FIG. 7, the sequence is similar to that described with reference to FIG. 6. The difference may be that ECC decoder 345 may be unable to correct for errors in component codeword 510. In that case, ECC decoder 345 may attempt to validate block codeword 505. Because block codeword 505 is larger, block codeword 505 may offer stronger correction, and therefore may be able to correct for errors that might not be correctable using component codeword 510 (although correcting errors using block codeword 505 might take longer than correcting errors using component codeword 510, given that block codeword 505 is larger than component codeword 510). If ECC decoder 345 is able to validate block codeword 505, or is able to correct any errors in block codeword 505, then data chunk 610 may be extracted and returned from storage device 120 (via host interface layer 310) back to machine 105 and ultimately to application 605. If ECC decoder 345 is unable to validate block codeword 505 and is unable to correct for any errors in block codeword 505, then storage device 120 may return an error to machine 105.

Figure 8:
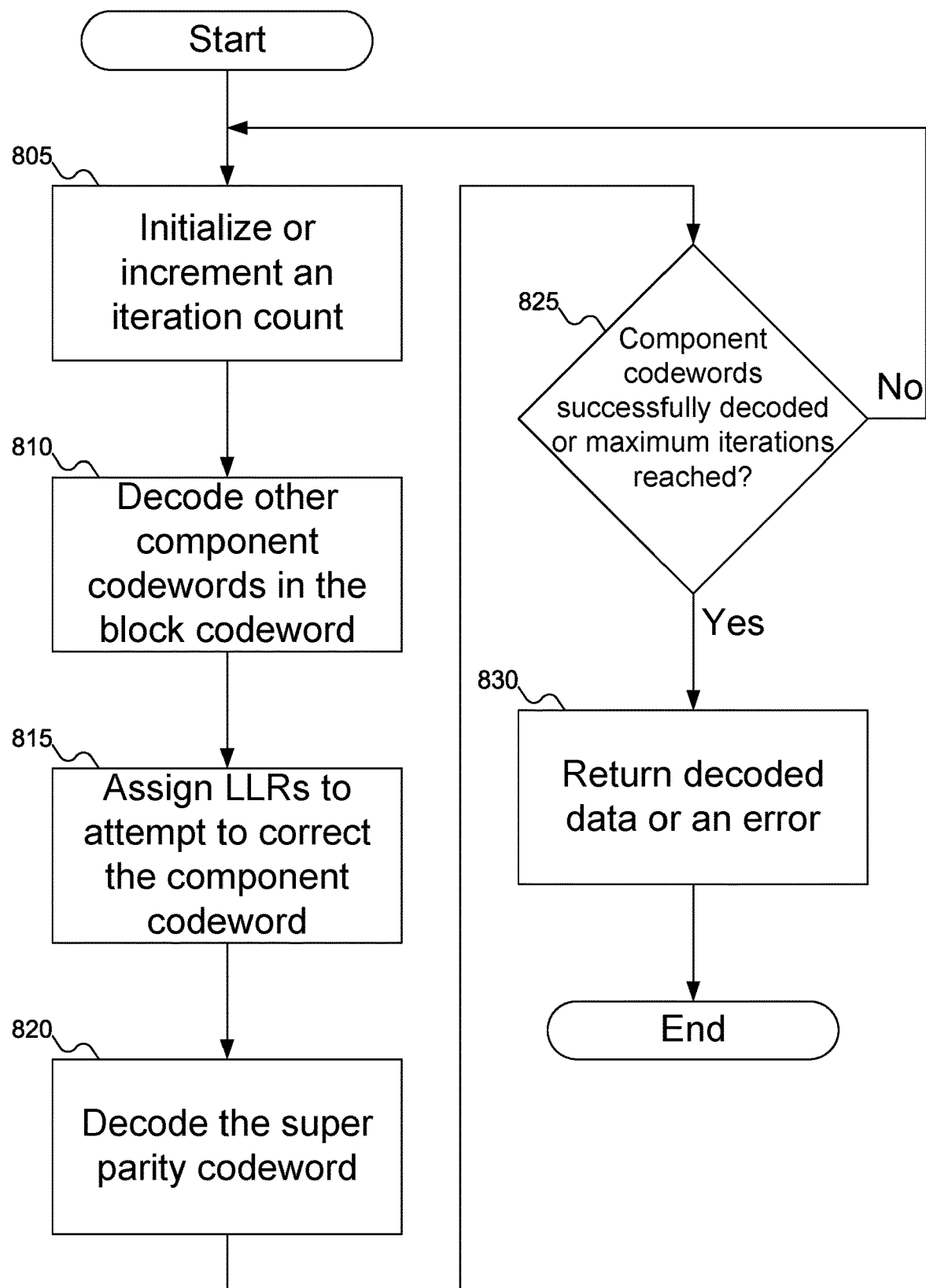
FIG. 8 shows a flowchart of an example procedure for the ECC decoder of FIG. 3 to attempt to correct for errors in the component codeword of FIG. 5, according to embodiments of the disclosure.

The above discussion does not address specifically how to correct component codeword 510 (or block codeword 505). Since such correction may depend on the implementation of ECC decoder 345, embodiments of the disclosure may support any desired approach to correct for errors in a codeword. As an example, an iterative decoding approach may be used to attempt to correct for errors in component codeword 510. FIG. 8 shows a flowchart of an example iterative decoding approach that may be used to correct errors in component codeword 510 of FIG. 5 using block codeword 505 of FIG. 5. A similar approach (with modifications to ignore other component codewords 510 of FIG. 5 or super parity codeword 515 of FIG. 5) may be used to attempt to correct errors within component codeword 510 of FIG. 5 without reference to block codeword 505 of FIG. 5 or super parity codeword 515 of FIG. 5.

In FIG. 8, it is assumed preliminarily that the component codeword has an error. At block 805, ECC decoder 345 of FIG. 3 may initialize or increment an iteration count. If ECC decoder 345 of FIG. 3 is in the first iteration of attempting to correct the errors, then the iteration count may be initialized to one; otherwise, the iteration count may be incremented by one. At block 810, ECC decoder 345 of FIG. 3 may decode the other component codewords 510 of FIG. 5. At block 815, ECC decoder 345 of FIG. 3 may assign log likelihood ratios to the bits in component codeword 510 of FIG. 5. A log likelihood ratio may represent the likelihood that a particular bit in component codeword 510 of FIG. 5 is a zero or a one. For example, the log likelihood ratio may range from −8 to 7, with −8 representing a very strong likelihood that the bit should be zero, 7 representing a very strong likelihood that the bit should be one, and 0 representing an equal likelihood that the bit could be either zero or one. Using the log likelihood ratios, ECC decoder 345 of FIG. 3 may change certain bits whose values are not consistent with the log likelihood ratios: the log likelihood ratios thus may represent indicators of which bits are most likely correct or incorrect.

At block 820, ECC decoder 345 of FIG. 3 may decode super parity codeword 515 of FIG. 5. At block 825, ECC decoder 345 of FIG. 3 may determine whether component codeword 510 of FIG. 5 has been successfully decoded (that is, the errors have been corrected), or a maximum number of iterations have been used in trying to correct the errors. If component codeword 510 of FIG. 5 has not been successfully decoded and the maximum number of iterations has not yet been tried, then processing may return to block 810 to attempt again to successfully decode component codeword 510 of FIG. 5. Otherwise, at block 830, the requested data may be returned (if component codeword 510 of FIG. 5 was successfully decoded) or an error may be returned (if the maximum number of iterations was reached without successfully decoding component codeword 510 of FIG. 5).

Figure 9:
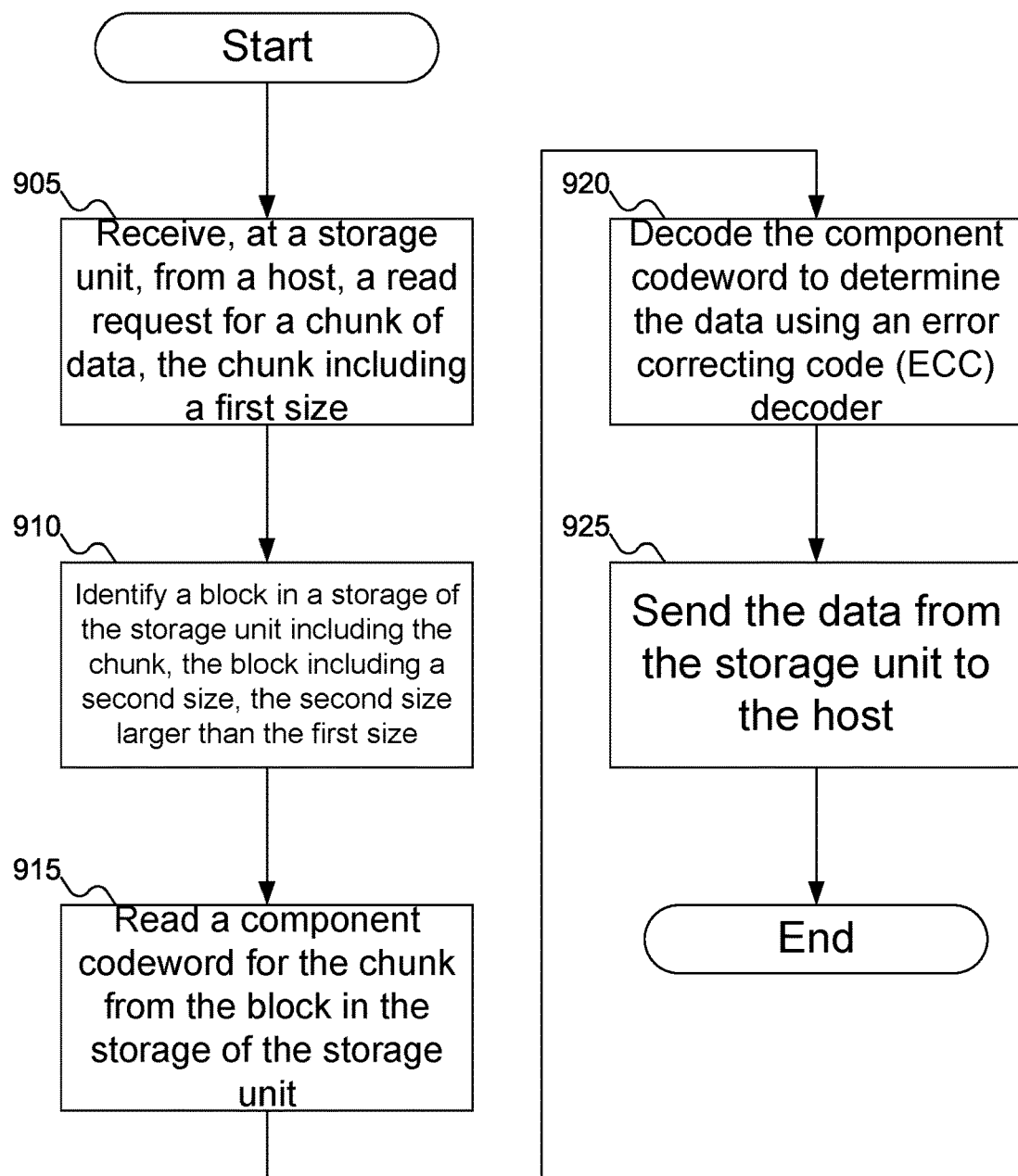
FIG. 9 shows a flowchart of an example procedure for the storage device of FIG. 1 to perform a low latency read, according to embodiments of the disclosure.

FIG. 9 shows a flowchart of an example procedure for storage device 120 of FIG. 1 to perform a low latency read, according to embodiments of the disclosure. In FIG. 9, at block 905, storage device 120 of FIG. 1 may receive a read request from machine 105 of FIG. 1. The read request may request data chunk 610 of FIG. 6, which may be smaller than the block in which data chunk 610 of FIG. 6 is stored. At block 910, storage device 120 of FIG. 1 may identify the block in storage 320 of FIG. 3 including data chunk 610 of FIG. 6. Storage device 120 of FIG. 1 may use translation layer 330 of FIG. 3 to map a logical address provided by machine 105 of FIG. 1 in the read request to a physical address in storage 320 of FIG. 3 where data chunk 610 of FIG. 6 is stored. As mentioned above, the block may be larger than data chunk 610 of FIG. 6.

At block 915, read/write circuit 335 of FIG. 3 may read component codeword 510 of FIG. 5 from the block. At block 920, ECC decoder 345 may decode component codeword 510 of FIG. 5. Once component codeword 510 of FIG. 5 is decoded, at block 925 storage device 120 of FIG. 1 may send data chunk 610 of FIG. 6 to machine 105 of FIG. 1.

Figure 10A:
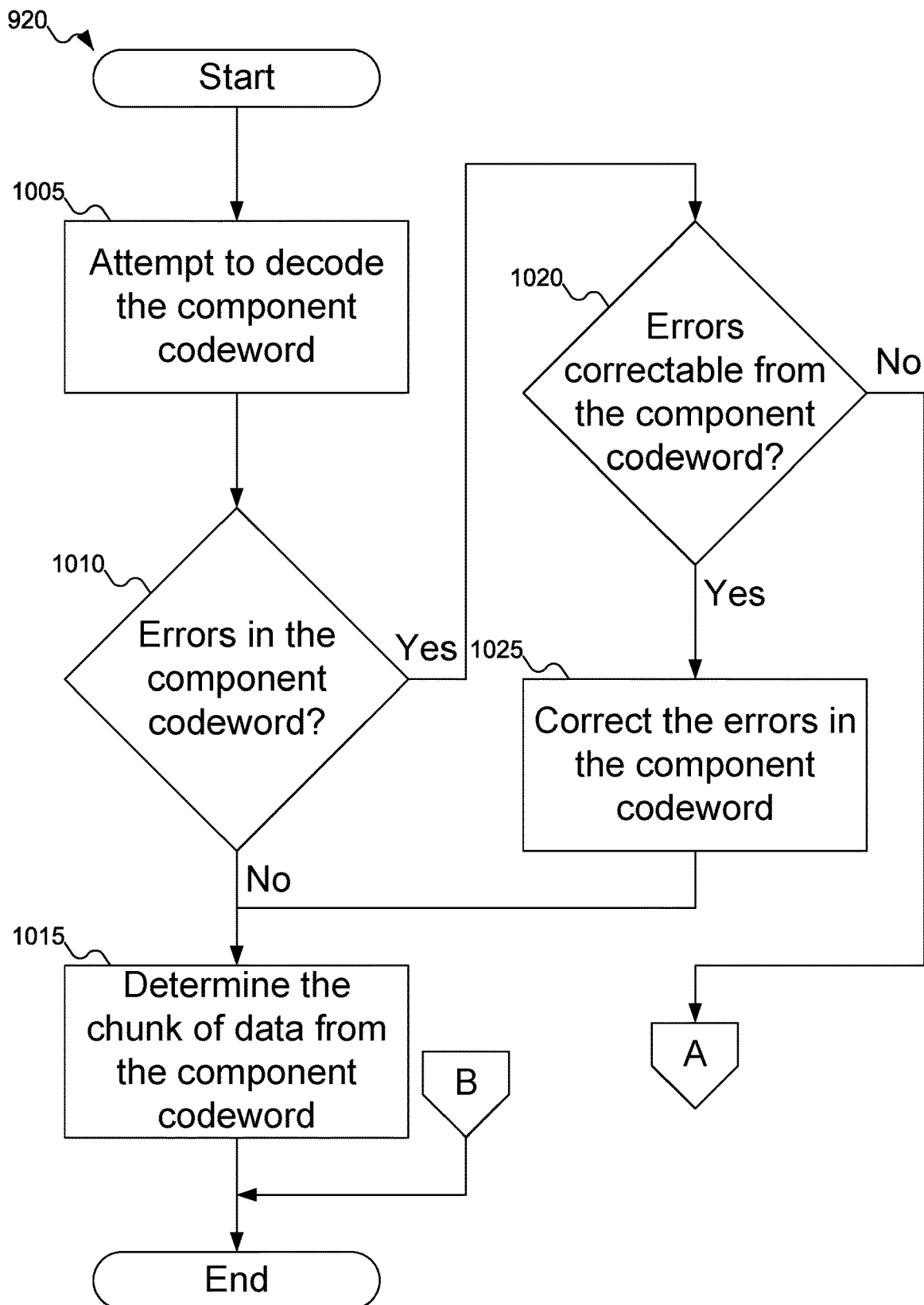
FIG. 10A shows a flowchart of another example procedure for the storage device of FIG. 1 to perform a low latency read, according to embodiments of the disclosure.
Figure 10B:
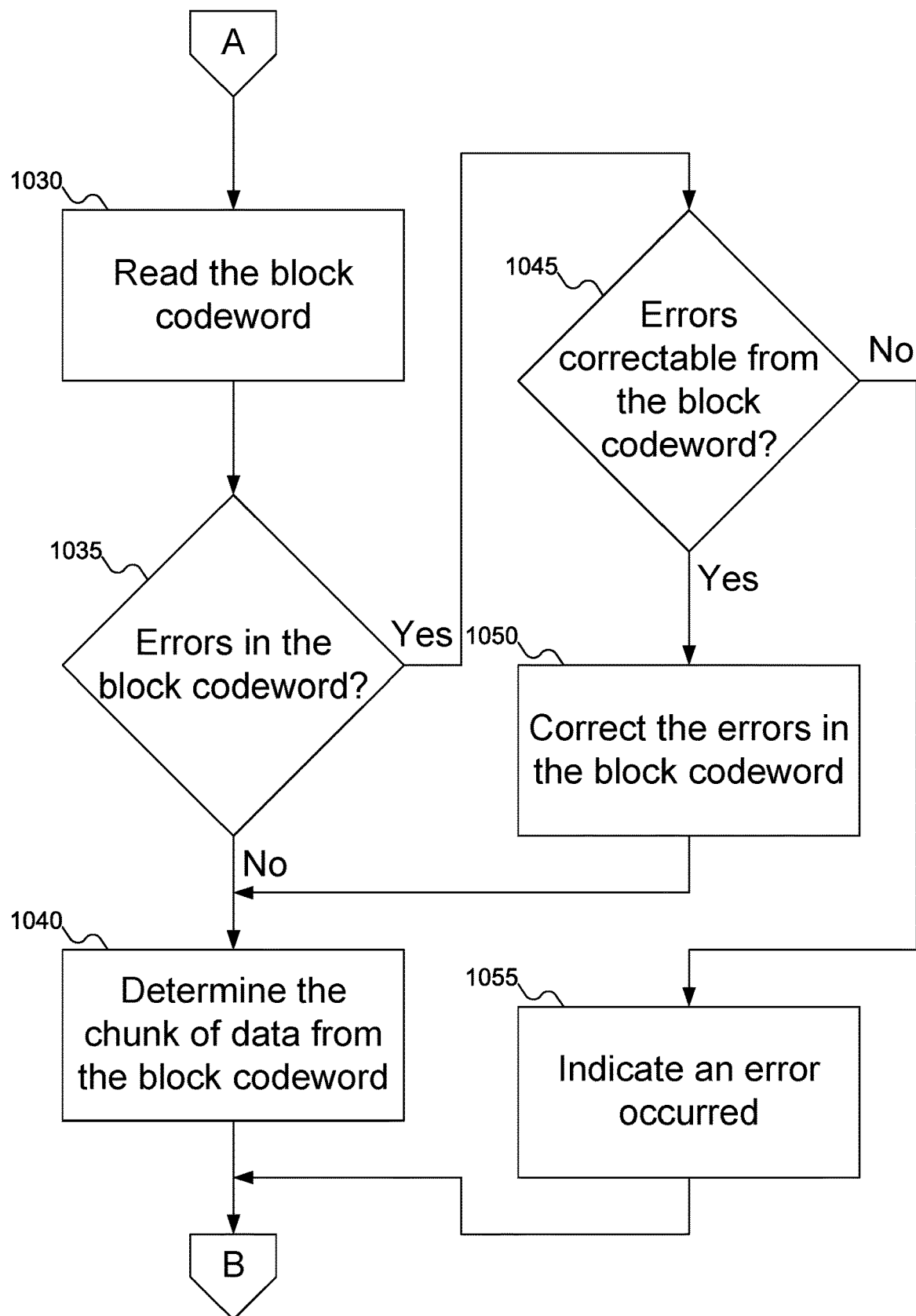
FIG. 10B continues the flowchart of FIG. 10A of the other example procedure for the storage device of FIG. 1 to perform a low latency read, according to embodiments of the disclosure.

FIGS. 10A-10B show a flowchart of another example procedure for storage device 120 of FIG. 1 to perform a low latency read, according to embodiments of the disclosure. In FIG. 10A, at block 1005, ECC decoder 345 of FIG. 3 may attempt to decode component codeword 510 of FIG. 5. At block 1010, ECC decoder 345 of FIG. 3 may determine if there were errors in component codeword 510 of FIG. 5. If there were no errors in component codeword 510 of FIG. 5, then at block 1015 storage device 120 of FIG. 1 may determine data chunk 610 of FIG. 6, for example, by removing the ECC bits added to data chunk 610 of FIG. 6 in component codeword 510 of FIG. 5 as stored in the block in storage 320 of FIG. 3, after which processing may end.

If there were errors in component codeword 510 of FIG. 1, then at block 1020 ECC decoder 345 of FIG. 3 may determine of the errors in component codeword 510 of FIG. 5 are correctable. If so, then at block 1025, ECC decoder 345 of FIG. 3 may correct the errors in component codeword 510 of FIG. 5, and processing may return to block 1015 to determine data chunk 610 of FIG. 6 from the corrected component codeword. Note that blocks 1020 and 1025 may be implemented in other ways. For example, ECC decoder 345 of FIG. 3 may attempt to correct the errors in component codeword 510 of FIG. 5, and may determine that the errors are not correctable by not being able to actually correct the errors in component codeword 510 of FIG. 5.

If the errors in component codeword 510 of FIG. 5 are not correctable, then at block 1030 (FIG. 10B), read/write circuit 335 of FIG. 3 may read block codeword 505 of FIG. 5. At block 1035, ECC decoder 345 of FIG. 3 may determine if there are errors in block codeword 505 of FIG. 5. If there were no errors in block codeword 505 of FIG. 5, then at block 1040 storage device 120 of FIG. 1 may determine data chunk 610 of FIG. 6, for example, by removing the ECC bits added to data chunk 610 of FIG. 6 in block codeword 505 of FIG. 5 as stored in the block in storage 320 of FIG. 3 and any bits not in data chunk 610 of FIG. 6, and processing may end.

If there were errors in block codeword 505 of FIG. 1, then at block 1045 ECC decoder 345 of FIG. 3 may determine of the errors in block codeword 505 of FIG. 5 are correctable. If so, then at block 1050, ECC decoder 345 of FIG. 3 may correct the errors in block codeword 505 of FIG. 5, and processing may return to block 1040 to determine data chunk 610 of FIG. 6 from the corrected block codeword. Note that blocks 1045 and 1050 may be implemented in other ways. For example, ECC decoder 345 of FIG. 3 may attempt to correct the errors in block codeword 505 of FIG. 5, and may determine that the errors are not correctable by not being able to actually correct the errors in block codeword 505 of FIG. 5.

Finally, if ECC decoder 345 of FIG. 3 determines that the errors in block codeword 505 of FIG. 5 are not correctable, then at block 1055 ECC decoder 345 of FIG. 3 may set an indicator that an error occurred, so that storage device 120 of FIG. 1 may inform machine 105 of FIG. 1 about the error.

Figure 11:
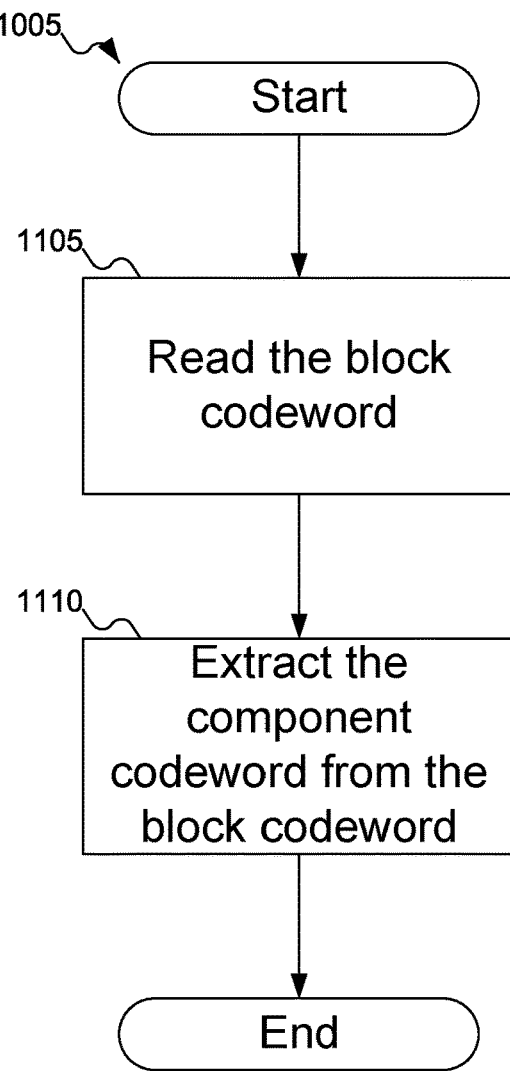
FIG. 11 shows a flowchart of an example procedure for the storage device of FIG. 1 to extract the component codeword of FIG. 5 from the block codeword of FIG. 5, according to embodiments of the disclosure.

FIG. 11 shows a flowchart of an example procedure for storage device 120 of FIG. 1 to extract component codeword 510 of FIG. 5 from block codeword 505 of FIG. 5, according to embodiments of the disclosure. In FIG. 11, at block 1105, read/write circuit 335 of FIG. 3 may read block codeword 505 of FIG. 5 from the block in storage 320 of FIG. 3. At block 1110, ECC decoder 345 of FIG. 3 may identify the bits that form component codeword 510 of FIG. 5 and extract those bits as component codeword 510 of FIG. 5.

Note that if read/write circuit 335 of FIG. 3 reads block codeword 505 of FIG. 5 at block 1105 as part of extracting component codeword 510 of FIG. 5, then later operations that may describe reading block codeword 505 of FIG. 5 from storage 320 of FIG. 3 may be unneeded. For example, block 1030 in FIG. 10B describes reading block codeword 505 of FIG. 5 in situations where component codeword 510 of FIG. 5 had errors that could not be corrected. But if block codeword 505 of FIG. 5 was previously read to extract component codeword 510 of FIG. 5, then block codeword 505 of FIG. 5 may already be available without having to read block codeword 505 of FIG. 5 from storage 320 of FIG. 3 again.

Figure 12A:
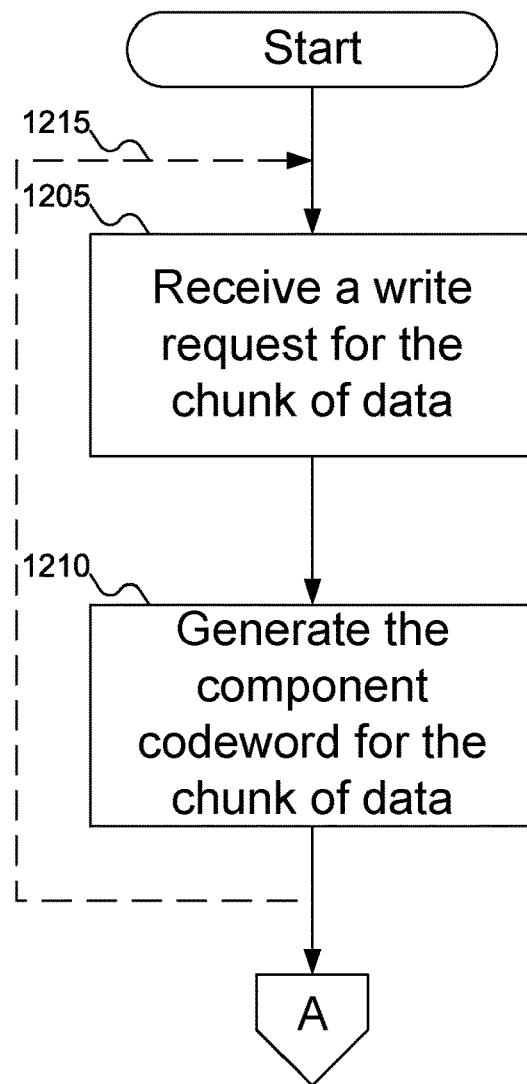
FIG. 12A shows a flowchart of an example procedure for the storage device of FIG. 1 to generate the component codewords of FIG. 5 and the block codewords of FIG. 5, according to embodiments of the disclosure.
Figure 12B:
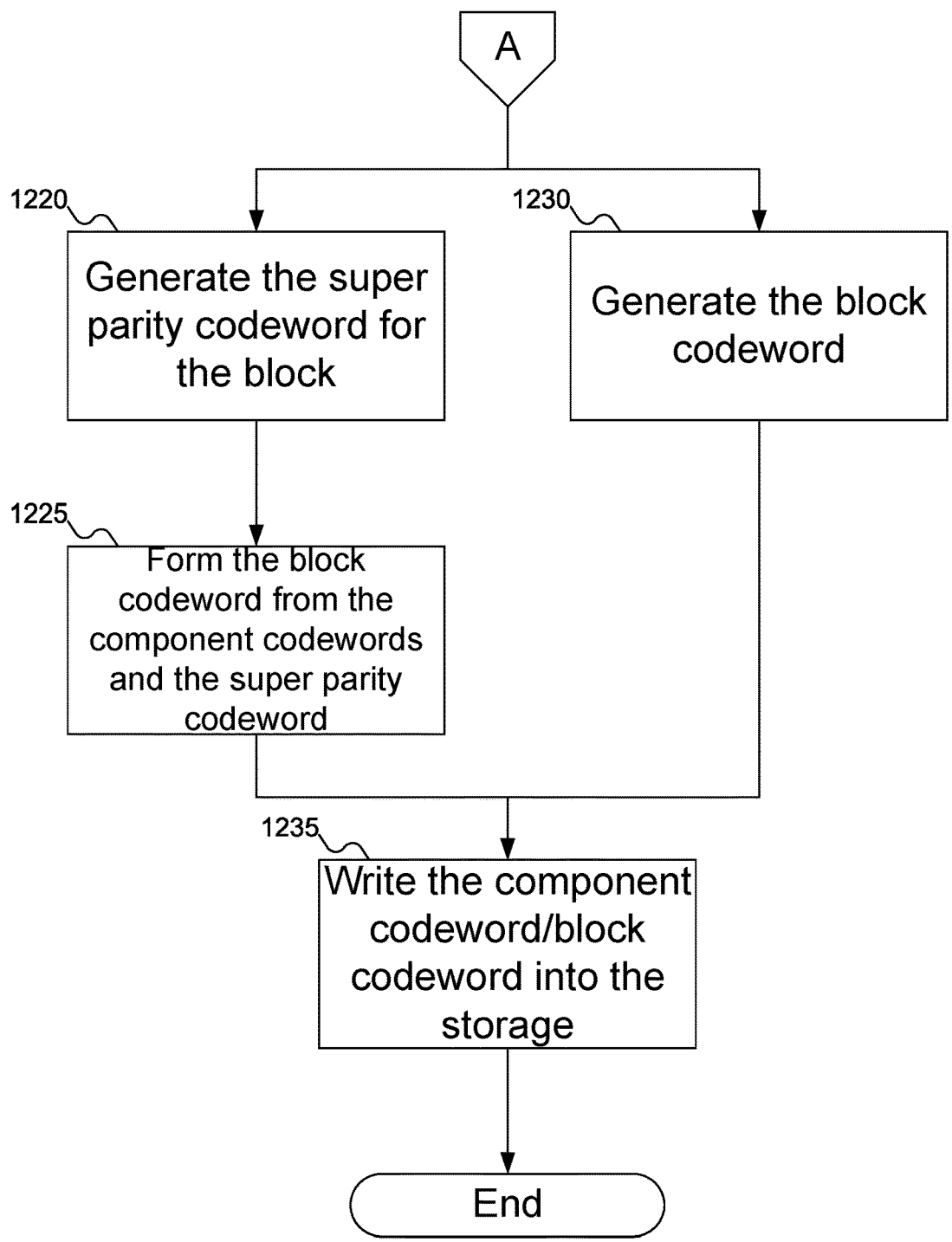
FIG. 12B continues the flowchart of FIG. 12A of the example procedure for the storage device of FIG. 1 to generate the component codewords of FIG. 5 and the block codewords of FIG. 5, according to embodiments of the disclosure.

FIGS. 12A-12B show a flowchart of an example procedure for storage device 120 of FIG. 1 to generate component codewords 510 of FIG. 5 and block codeword 505 of FIG. 5, according to embodiments of the disclosure. In FIG. 12A, at block 1205, storage device 120 of FIG. 1 may receive a write request for data chunk 610 of FIG. 6. At block 1210, ECC encoder 340 of FIG. 3 may generate component codeword 510 of FIG. 5 for data chunk 610 of FIG. 6. If storage device 120 of FIG. 1 receives multiple such data chunks 610 of FIG. 6, then blocks 1205 and 1210 may be repeated as often as necessary, as shown by dashed arrow 1215.

At block 1220 (FIG. 12B), ECC encoder 340 of FIG. 3 may generate super parity codeword 515 of FIG. 5, and at block 1225, ECC encoder 340 of FIG. 3 may form block codeword 505 from component codewords 510 of FIG. 5 and super parity codeword 515 of FIG. 5. Note that it is also possible to form the codewords in a different manner: for example, once all the write requests are received from machine 105 of FIG. 1, ECC encoder 340 may generate block codeword 505 of FIG. 5, which may logically divided to form component codewords 510 of FIG. 5 and super parity codeword 515 of FIG. 5.

Alternatively, as described above, embodiments of the disclosure may use different parity check matrices to validate component codewords 510 of FIG. 5 and block codeword 505 of FIG. 5. In such embodiments of the disclosure, at block 1230, block codeword 505 of FIG. 5 may be generated based on the received data.

Finally, at block 1235, read/write circuit 335 of FIG. 3 may write component codewords 510 of FIG. 5, super parity codeword 515 of FIG. 5, and/or block codeword 505 of FIG. 5 into storage 320 of FIG. 3, so that they are available for use by ECC decoder 345 of FIG. 3 to process read requests.

In FIGS. 8-12B, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a storage unit that may be configured to use a higher than normal power level for a boot process. The host may specify the amount of power the storage unit may use, as well as a duration for which this amount of power may be used, before the storage unit is expected to use the normal power level. By using a higher than normal power level, the storage unit may boot more quickly, offering a technical advantage over storage units that only boot using the specified normal power level.

Embodiments of the disclosure may also include the storage unit informing the host of one or more power levels for which the storage unit has a validated boot process, and how long the boot process may take at that power level. By providing this information to the host, the host may be able to determine a power level the storage unit may use to boot more quickly, providing a technical advantage over storage units that only boot using the specified normal power level.

In some examples, hard disk drives (HDDs) may consume more power than their average allowable range during the transition from idle to active. This may be needed by HDDs because HDDs need to move their actuator from the parked position during idle onto the disks.

This increased power consumption by HDDs may be acceptable to hosts because the power exceeding the normal allowable is short and may be quantified and absorbed by enclosure level capacitors. In the event that the entire enclosure is coming back from idle, the host may spread the traffic to the HDDs distribute the power spikes in the enclosure.

Solid State Drives (SSDs) do not have an actuator to move. But SSDs still use have a boot time. In a power constrained environment (for example 12 W) deployments, an SSD may throttle itself to stay within 12 W. Throttling methods may include: lowering the clock on controller/DRAM/channels and distributing fewer reads/writes to the NAND for reduced activity and parallelism. These options may slow the boot time of the SSD.

Generally boots are from a cool server. Additional heat (beyond nominal ratings) may be acceptable due to lower temperatures. The host may control the boot order of all enclosure components. Slow boots may be undesirable for customers that need to use their servers. Over designed power supplies may tolerate power deviations from SSDs in an ordered boot scenario.

Embodiments of the disclosure may enable an SSD to consume more power during boot. The amount of extra power and length of time for this extra power may be quantified. This extra power may be used to accelerate the boot of the SSD by increasing clock rates (for example, for the controller, DRAM, channels, etc.) or increasing the number of inputs/outputs (IOs) outstanding to the underlying flash storage.

Embodiments of the disclosure may also allow the host to query the SSD for the requested peak power consumption and time duration. The host may accept this information or may communicate a lower bound to SSD on the excursion time and/or peak power. SSDs that are unable to complete the boot during these new limits set by the host may continue to boot in a normal power constrained manner. The hosts may use this information to distribute the boot of all SSDs in an enclosure or bound the power excursions to fit within the enclosure's capabilities.

While the above discussion focuses on a 12 W power limit, embodiments of the disclosure are applicable even in power limits that are not 12 W. For example, some large capacity high performance drives may be constrained at 25 W or higher.

The SSD may propose several operating limit choices. This may reduce validation efforts. Example options may include: 14 W for 1 second; 13 W for 4 seconds; 12.5 W for 10 seconds.

While the focus of the above discussion is on SSDs, embodiments of the disclosure may extend to other medias (phase change memory (PCM), magnetoresistive random-access memory (MRAM), resistive random-access memory (ReRAM), etc.) and other interfaces (non-volatile dual inline memory module (NVDIMM), cache-coherent interconnect protocols such as Compute Express Link (CXL), etc.).

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a storage unit, comprising:
 a storage for a component codeword, the component codeword stored in a block in the storage, the block further storing a block codeword;
 an interface to receive a read request for a chunk of data from a host and to send the chunk of data to the host;
 a circuit to read the component codeword from the block in the storage;
 an error correcting code (ECC) decoder to determine the chunk of data based at least in part on the component codeword.

Statement 2. An embodiment of the disclosure includes the storage unit according to statement 1, wherein the ECC decoder is configured to decode the chunk of data from the component codeword.

Statement 3. An embodiment of the disclosure includes the storage unit according to statement 2, wherein the ECC decoder is configured to decode the chunk of data from the component codeword based at least in part on the component codeword including no errors.

Statement 4. An embodiment of the disclosure includes the storage unit according to statement 2, wherein ECC decoder is configured to generate a corrected component codeword from the component codeword and decode the chunk of data from the corrected component codeword.

Statement 5. An embodiment of the disclosure includes the storage unit according to statement 4, wherein the ECC decoder is configured to iteratively generate the corrected component codeword.

Statement 6. An embodiment of the disclosure includes the storage unit according to statement 1, wherein:
 the ECC decoder is unable to decode the chunk of data from the component codeword; and
 the storage unit further comprises a second ECC decoder to generate a corrected block codeword from the block codeword and to decode the chunk of data from the corrected block codeword.

Statement 7. An embodiment of the disclosure includes the storage unit according to statement 6, wherein the second ECC decoder is configured to iteratively generate the corrected block codeword.

Statement 8. An embodiment of the disclosure includes the storage unit according to statement 6, wherein the second ECC decoder is the ECC decoder.

Statement 9. An embodiment of the disclosure includes the storage unit according to statement 1, wherein the circuit is configured to read the block codeword from the block in the storage and to extract the component codeword from the block codeword.

Statement 10. An embodiment of the disclosure includes the storage unit according to statement 9, wherein the block codeword includes at least the component codeword and a super parity codeword.

Statement 11. An embodiment of the disclosure includes the storage unit according to statement 1, wherein:
the interface is configured to receive a write request for the chunk of data from the host; and
the storage unit further comprises:
an ECC encoder to generate the component codeword based least in part on the chunk of data; and
a second circuit to write the component codeword into the block in the storage.

Statement 12. An embodiment of the disclosure includes the storage unit according to statement 11, further comprising:
a second ECC encoder to generate a second component codeword based at least in part on a second chunk of data; and
a third ECC encoder to generate a super parity codeword based at least in part on the chunk of data and the second chunk of data.

Statement 13. An embodiment of the disclosure includes the storage unit according to statement 12, wherein the second circuit is configured to form the block codeword based at least in part on the component codeword, the second component codeword, and the super parity codeword.

Statement 14. An embodiment of the disclosure includes the storage unit according to statement 13, wherein the second circuit is configured to write the block codeword into the block in the storage.

Statement 15. An embodiment of the disclosure includes the storage unit according to statement 12, wherein:
the second ECC encoder is the ECC encoder; and
the third ECC encoder is the ECC encoder.

Statement 16. An embodiment of the disclosure includes the storage unit according to statement 11, wherein:
the storage unit further comprises a second ECC encoder to generate the block codeword based at least in part on the chunk of data and a second chunk of data; and
the second circuit is configured to write the block codeword into the block in the storage.

Statement 17. An embodiment of the disclosure includes the storage unit according to statement 16, wherein the second ECC encoder is the ECC encoder.

Statement 18. An embodiment of the disclosure includes a method, comprising:
receiving, at a storage unit, from a host, a read request for a chunk of data, the chunk including a first size;
identifying a block in a storage of the storage unit including the chunk, the block including a second size, the second size larger than the first size;
reading a component codeword for the chunk from the block in the storage of the storage unit;
decoding the component codeword to determine the chunk of data using an error correcting code (ECC) decoder; and
sending the chunk of data from the storage unit to the host,
wherein the block includes a block codeword to decode of the block.

Statement 19. An embodiment of the disclosure includes the method according to statement 18, wherein decoding the component codeword to determine the chunk of data using the ECC decoder includes:
determining, using the ECC decoder, that the component codeword includes no errors; and
determining the chunk of data from the component codeword.

Statement 20. An embodiment of the disclosure includes the method according to statement 18, wherein decoding the component codeword to determine the chunk of data includes:
determining, using the ECC decoder, that the component codeword includes an error;
correcting the error to generate a corrected component codeword using the ECC decoder; and
determining the chunk of data from the corrected component codeword.

Statement 21. An embodiment of the disclosure includes the method according to statement 20, wherein correcting the error to generate the corrected component codeword using the ECC decoder includes iteratively decoding the component codeword using the ECC decoder to generate the corrected component codeword.

Statement 22. An embodiment of the disclosure includes the method according to statement 20, wherein decoding the component codeword to determine the chunk of data includes:
determining, using the ECC decoder, that the component codeword includes a first error;
determining that the first error is uncorrectable;
reading the block codeword from the block in the storage of the storage unit;
determining, using the ECC decoder, that the block codeword includes a second error;
correcting the second error to generate a corrected block codeword using the ECC decoder; and
determining the chunk of data from the corrected block codeword.

Statement 23. An embodiment of the disclosure includes the method according to statement 22, wherein determining that the first error is uncorrectable includes determining that the first error is uncorrectable based at least in part on iteratively decoding the component codeword using the ECC decoder and the ECC decoder exceeding a maximum number of iterations.

Statement 24. An embodiment of the disclosure includes the method according to statement 22, wherein correcting the second error to generate the corrected block codeword using the ECC decoder includes iteratively decoding the block codeword using the ECC decoder to generate the corrected block codeword.

Statement 25. An embodiment of the disclosure includes the method according to statement 24, wherein determining the chunk of data from the corrected block codeword includes returning a read error based at least in part on the ECC decoder exceeding a maximum number of iterations.

Statement 26. An embodiment of the disclosure includes the method according to statement 20, wherein decoding the component codeword to determine the chunk of data includes:
determining, using the ECC decoder, that the component codeword includes a first error;
determining that the first error is uncorrectable;
reading the block codeword from the block in the storage of the storage unit;
determining, using a second ECC decoder, that the block codeword includes a second error;
correcting the second error to generate a corrected block codeword using the second ECC decoder; and
determining the chunk of data from the corrected block codeword.

Statement 27. An embodiment of the disclosure includes the method according to statement 18, wherein reading the component codeword for the chunk from the block in the storage of the storage unit includes:

reading the block codeword from the block in the storage of the storage unit; and extracting the component codeword from the block codeword.

Statement 28. An embodiment of the disclosure includes the method according to statement 27, wherein the block codeword includes at least the component codeword and a super parity codeword.

Statement 29. An embodiment of the disclosure includes the method according to statement 18, further comprising:

receiving, at the storage unit, from the host, a write request for the chunk of data;

generating the component codeword based at least in part on the chunk of data; and writing the component codeword to the block in the storage of the storage unit.

Statement 30. An embodiment of the disclosure includes the method according to statement 29, wherein generating the component codeword based at least in part on the chunk of data includes:

generating the component codeword based at least in part on the chunk of data;

generating a second component codeword based at least in part on a second chunk of data; and generating a super parity codeword based at least in part on the chunk of data and the second chunk of data.

Statement 31. An embodiment of the disclosure includes the method according to statement 30, wherein writing the component codeword to the block in the storage of the storage unit includes:

forming the block codeword based at least in part on the component codeword, the second component codeword, and the super parity codeword; and writing the block codeword to the block in the storage of the storage unit.

Statement 32. An embodiment of the disclosure includes the method according to statement 29, wherein generating the component codeword based at least in part on the chunk of data includes generating the component codeword using an ECC encoder based at least in part on the chunk of data.

Statement 33. An embodiment of the disclosure includes the method according to statement 32, further comprising:

generating the block codeword using a second ECC encoder based at least in part on the chunk of data and a second chunk of data; and writing the block codeword to the block in the storage of the storage unit.

Statement 34. An embodiment of the disclosure includes an article, comprising a non-transitory storage medium, the non-transitory storage medium having stored thereon instructions that, when executed by a machine, result in:

receiving, at a storage unit, from a host, a read request for a chunk of data, the chunk including a first size;

identifying a block in a storage of the storage unit including the chunk, the block including a second size, the second size larger than the first size;

reading a component codeword for the chunk from the block in the storage of the storage unit;

decoding the component codeword to determine the chunk of data using an error correcting code (ECC) decoder; and sending the chunk of data from the storage unit to the host, wherein the block includes a block codeword to decode of the block.

Statement 35. An embodiment of the disclosure includes the article according to statement 34, wherein decoding the component codeword to determine the chunk of data using the ECC decoder includes:

determining, using the ECC decoder, that the component codeword includes no errors; and determining the chunk of data from the component codeword.

Statement 36. An embodiment of the disclosure includes the article according to statement 34, wherein decoding the component codeword to determine the chunk of data includes:

determining, using the ECC decoder, that the component codeword includes an error;

correcting the error to generate a corrected component codeword using the ECC decoder; and determining the chunk of data from the corrected component codeword.

Statement 37. An embodiment of the disclosure includes the article according to statement 36, wherein correcting the error to generate the corrected component codeword using the ECC decoder includes iteratively decoding the component codeword using the ECC decoder to generate the corrected component codeword.

Statement 38. An embodiment of the disclosure includes the article according to statement 36, wherein decoding the component codeword to determine the chunk of data includes:

determining, using the ECC decoder, that the component codeword includes a first error;

determining that the first error is uncorrectable;

reading the block codeword from the block in the storage of the storage unit;

determining, using the ECC decoder, that the block codeword includes a second error;

correcting the second error to generate a corrected block codeword using the ECC decoder; and determining the chunk of data from the corrected block codeword.

Statement 39. An embodiment of the disclosure includes the article according to statement 38, wherein determining that the first error is uncorrectable includes determining that the first error is uncorrectable based at least in part on iteratively decoding the component codeword using the ECC decoder and the ECC decoder exceeding a maximum number of iterations.

Statement 40. An embodiment of the disclosure includes the article according to statement 38, wherein correcting the second error to generate the corrected block codeword using the ECC decoder includes iteratively decoding the block codeword using the ECC decoder to generate the corrected block codeword.

Statement 41. An embodiment of the disclosure includes the article according to statement 40, wherein determining the chunk of data from the corrected block codeword includes returning a read error based at least in part on the ECC decoder exceeding a maximum number of iterations.

Statement 42. An embodiment of the disclosure includes the article according to statement 36, wherein decoding the component codeword to determine the chunk of data includes:

determining, using the ECC decoder, that the component codeword includes a first error;

determining that the first error is uncorrectable;

reading the block codeword from the block in the storage of the storage unit;
determining, using a second ECC decoder, that the block codeword includes a second error;
correcting the second error to generate a corrected block codeword using the second ECC decoder; and
determining the chunk of data from the corrected block codeword.

Statement 43. An embodiment of the disclosure includes the article according to statement 34, wherein reading the component codeword for the chunk from the block in the storage of the storage unit includes:
reading the block codeword from the block in the storage of the storage unit; and
extracting the component codeword from the block codeword.

Statement 44. An embodiment of the disclosure includes the article according to statement 43, wherein the block codeword includes at least the component codeword and a super parity codeword.

Statement 45. An embodiment of the disclosure includes the article according to statement 34, the non-transitory storage medium having stored thereon further instructions that, when executed by the machine, result in:
receiving, at the storage unit, from the host, a write request for the chunk of data;
generating the component codeword based at least in part on the chunk of data; and
writing the component codeword to the block in the storage of the storage unit.

Statement 46. An embodiment of the disclosure includes the article according to statement 45, wherein generating the component codeword based at least in part on the chunk of data includes:
generating the component codeword based at least in part on the chunk of data;
generating a second component codeword based at least in part on a second chunk of data; and
generating a super parity codeword based at least in part on the chunk of data and the second chunk of data.

Statement 47. An embodiment of the disclosure includes the article according to statement 46, wherein writing the component codeword to the block in the storage of the storage unit includes:
forming the block codeword based at least in part on the component codeword, the second component codeword, and the super parity codeword; and
writing the block codeword to the block in the storage of the storage unit.

Statement 48. An embodiment of the disclosure includes the article according to statement 45, wherein generating the component codeword based at least in part on the chunk of data includes generating the component codeword using an ECC encoder based at least in part on the chunk of data.

Statement 49. An embodiment of the disclosure includes the article according to statement 48, the non-transitory storage medium having stored thereon further instructions that, when executed by the machine, result in:
generating the block codeword using a second ECC encoder based at least in part on the chunk of data and a second chunk of data; and
writing the block codeword to the block in the storage of the storage unit.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage unit, comprising:
a storage for a component codeword, the component codeword stored in a block of a first size in the storage, the block further storing a block codeword;
an interface to receive a read request for a chunk of data of a second size from a host and to send the chunk of data to the host, the second size smaller than the first size;
a circuit to read the component codeword from the block in the storage;
an error correcting code (ECC) decoder to determine the chunk of data based at least in part on the component codeword.

2. The storage unit according to claim 1, wherein the ECC decoder is configured to decode the chunk of data from the component codeword.

3. The storage unit according to claim 2, wherein the ECC decoder is configured to generate a corrected component codeword from the component codeword and decode the chunk of data from the corrected component codeword.

4. The storage unit according to claim 3, wherein the ECC decoder is configured to iteratively generate the corrected component codeword.

5. The storage unit according to claim 1, further comprising a second ECC decoder to generate a corrected block codeword from the block codeword and to decode the chunk of data from the corrected block codeword.

6. The storage unit according to claim 5, wherein the second ECC decoder is configured to iteratively generate the corrected block codeword based at least in part on the block codeword.

7. The storage unit according to claim 5, wherein the second ECC decoder is the ECC decoder.

8. The storage unit according to claim 1, wherein the circuit is configured to read the block codeword from the block in the storage and to extract the component codeword from the block codeword.

9. A method, comprising:
receiving, at a storage unit, from a host, a read request for a chunk of data of a first size;
identifying a block in a storage of the storage unit including the chunk, the block including a second size, the second size larger than the first size;
reading a component codeword for the chunk from the block in the storage of the storage unit;
decoding the component codeword to determine the chunk of data using an error correcting code (ECC) decoder; and
sending the chunk of data from the storage unit to the host,
wherein the block includes a block codeword to decode of the block.

10. The method according to claim 9, wherein decoding the component codeword to determine the chunk of data includes:
determining, using the ECC decoder, that the component codeword includes an error;
correcting the error to generate a corrected component codeword using the ECC decoder; and
determining the chunk of data from the corrected component codeword.

11. The method according to claim 10, wherein correcting the error to generate the corrected component codeword using the ECC decoder includes iteratively decoding the component codeword using the ECC decoder to generate the corrected component codeword.

12. The method according to claim 10, wherein decoding the component codeword to determine the chunk of data includes:
   determining, using the ECC decoder, that the component codeword includes a first error;
   determining that the first error is uncorrectable;
   reading the block codeword from the block in the storage of the storage unit;
   determining, using the ECC decoder, that the block codeword includes a second error based at least in part on the first error being uncorrectable;
   correcting the second error to generate a corrected block codeword using the ECC decoder; and
   determining the chunk of data from the corrected block codeword.

13. The method according to claim 12, wherein determining that the first error is uncorrectable includes determining that the first error is uncorrectable based at least in part on iteratively decoding the component codeword using the ECC decoder and the ECC decoder exceeding a maximum number of iterations.

14. The method according to claim 12, wherein correcting the second error to generate the corrected block codeword using the ECC decoder includes iteratively decoding the block codeword using the ECC decoder to generate the corrected block codeword based at least in part on the block codeword.

15. The method according to claim 14, wherein determining the chunk of data from the corrected block codeword includes returning a read error based at least in part on the ECC decoder exceeding a maximum number of iterations.

16. The method according to claim 10, wherein decoding the component codeword to determine the chunk of data includes:
   determining, using the ECC decoder, that the component codeword includes a first error;
   determining that the first error is uncorrectable;
   reading the block codeword from the block in the storage of the storage unit;
   determining, using a second ECC decoder, that the block codeword includes a second error based at least in part on the first error being uncorrectable;
   correcting the second error to generate a corrected block codeword using the second ECC decoder; and
   determining the chunk of data from the corrected block codeword.

17. The method according to claim 9, wherein reading the component codeword for the chunk from the block in the storage of the storage unit includes:
   reading the block codeword from the block in the storage of the storage unit; and
   extracting the component codeword from the block codeword.

18. The method according to claim 17, wherein the block codeword includes at least the component codeword and a super parity codeword.

19. An article, comprising a non-transitory storage medium, the non-transitory storage medium having stored thereon instructions that, when executed by a machine, result in:
   receiving, at a storage unit, from a host, a read request for a chunk of data of a first size;
   identifying a block in a storage of the storage unit including the chunk, the block including a second size, the second size larger than the first size;
   reading a component codeword for the chunk from the block in the storage of the storage unit;
   decoding the component codeword to determine the chunk of data using an error correcting code (ECC) decoder; and
   sending the chunk of data from the storage unit to the host,
   wherein the block includes a block codeword to decode of the block.

20. The article according to claim 19, wherein decoding the component codeword to determine the chunk of data includes:
   determining, using the ECC decoder, that the component codeword includes an error;
   correcting the error to generate a corrected component codeword using the ECC decoder; and
   determining the chunk of data from the corrected component codeword.

* * * * *